(12) United States Patent
Chien et al.

(10) Patent No.: US 7,253,927 B2
(45) Date of Patent: Aug. 7, 2007

(54) METHOD OF ADJUSTING HALFTONE IMAGE DOT POSITIONS FOR IMPROVING PRINT QUALITY

(75) Inventors: Hui-Jan Chien, Taipei (TW); Jia-Hung Tsai, Taipei (TW)

(73) Assignee: BenQ Corporation, Gueishan, Tao-Yuan Hsien (TW)

( * ) Notice: Subject to any disclaimer, the term of this patent is extended or adjusted under 35 U.S.C. 154(b) by 873 days.

(21) Appl. No.: 10/605,649

(22) Filed: Oct. 15, 2003

(65) Prior Publication Data
US 2005/0083555 A1 Apr. 21, 2005

(51) Int. Cl.
G06K 15/00 (2006.01)
H04N 1/46 (2006.01)

(52) U.S. Cl. .................................... 358/3.06; 358/534

(58) Field of Classification Search ................. 358/1.9, 358/3.02, 3.06, 3.09, 3.1, 534, 535, 536, 358/540
See application file for complete search history.

(56) References Cited

U.S. PATENT DOCUMENTS 5,045,931 A * 9/1991 Sakamoto .................... 358/534

2001/0050776 A1 * 12/2001 Obata
2002/0051209 A1 * 5/2002 Yamada
2003/0090729 A1 * 5/2003 Loce et al.

FOREIGN PATENT DOCUMENTS

JP H06-6586 1/1994
JP H07-170400 7/1995

* cited by examiner

Primary Examiner—Douglas Q. Tran
(74) Attorney, Agent, or Firm—Winston Hsu

(57) ABSTRACT

A method of adjusting positions of dots in an original halftone image for improving quality of printed images, the original halftone image including a plurality of pixels containing either dots to be printed or blank spaces. The method includes selecting a pixel in the original halftone image containing a selected dot to be printed, analyzing pixels in the original halftone image neighboring the selected pixel to determine if the neighboring pixels contain dots to be printed, adjusting the position of the selected dot in the selected pixel to increase an average distance between the selected dot and the dots in the neighboring pixels, and creating a modified halftone image in which the position of selected dot has been adjusted.

11 Claims, 6 Drawing Sheets

| Binary code | Horizontal position | Vertical position |
|---|---|---|
| 00000000 | x0 | y0 |
| 00000001 | x1 | y1 |
| 00000010 | x2 | y2 |
| ⋮ | ⋮ | ⋮ |
| 11111110 | x254 | y254 |
| 11111111 | x255 | y255 |

METHOD OF ADJUSTING HALFTONE IMAGE DOT POSITIONS FOR IMPROVING PRINT QUALITY

BACKGROUND OF INVENTION

1. Field of the Invention

The present invention relates to a halftone images, and more specifically, to a method of adjusting the position of dots in the halftone image for improving image quality.

2. Description of the Prior Art

Halftoning describes the process of displaying an image on a device which is capable of representing only a finite, discrete number of tone levels. The position and arrangement of the discrete picture elements should create the illusion of a continuous-tone image. Using traditional halftoning techniques such as error diffusion or dithering matrix, undesirable visual patterns often appear, caused by the fact that the dots are placed along a distinct, rectangular (or sometimes hexagonal) grid.

Please refer to FIG. 1. FIG. 1 is an original halftone image 10 according to the prior art. The halftone image 10 is created according to techniques well known in the art, such as through error diffusion or dithering matrix algorithms. The halftone image 10 contains a plurality of pixels, each of which contains either a dot to be printed or a blank space. For instance, in FIG. 1, pixel 12 contains a blank space whereas pixel 14 contains a dot to be printed. Unfortunately, the dots in the halftone image 10 sometimes appear too close together, and form large block patterns in the images printed from the halftone image 10. For example, near the top-left corner of the halftone image 10 is a block 16 of three pixels containing dots to be printed. Because the three pixels in the block 16 are all contiguous, the block 16 looks like one very long pixel instead of three separate pixels. The end result is that the halftone image 10 contains many undesirable block patterns, and the quality of printed images suffers.

SUMMARY OF INVENTION

It is therefore a primary objective of the claimed invention to provide a method for adjusting dot positions within pixels of the halftone image in order to solve the above-mentioned problems.

According to the claimed invention, a method of adjusting positions of dots in an original halftone image for improving quality of printed images is disclosed. The original halftone image contains a plurality of pixels containing either dots to be printed or blank spaces. The method includes selecting a pixel in the original halftone image containing a selected dot to be printed, analyzing pixels in the original halftone image neighboring the selected pixel to determine if the neighboring pixels contain dots to be printed, adjusting the position of the selected dot in the selected pixel to increase an average distance between the selected dot and the dots in the neighboring pixels, and creating a modified halftone image in which the position of selected dot has been adjusted.

It is an advantage of the claimed invention that the position of the selected dot is adjusted to increase the average distance between the selected dot and the dots in the neighboring pixels. Separating the dots increases the resolution of the modified halftone image and increases the quality of images printed from the modified halftone image.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 2:
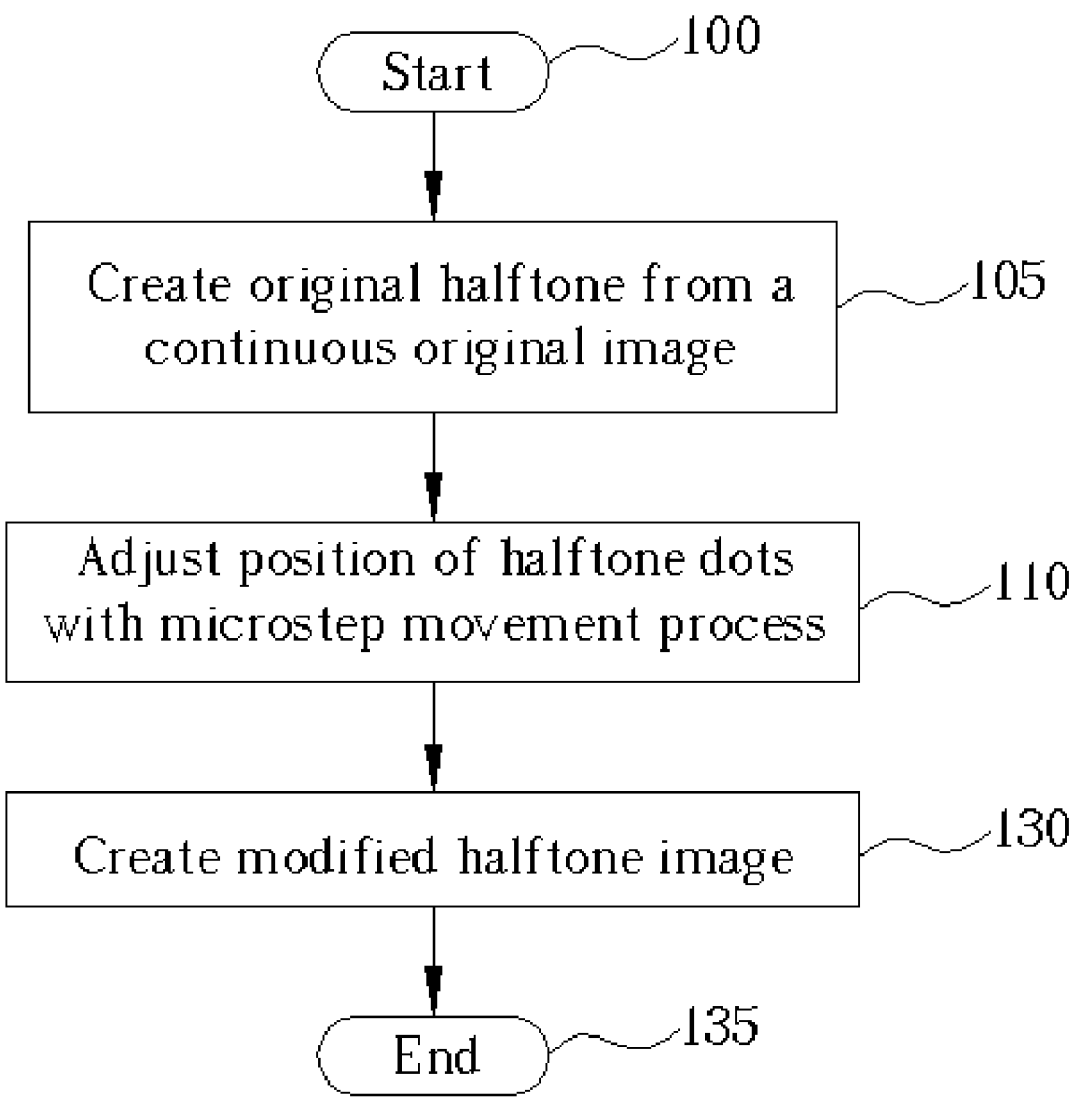
FIG. 2 is a flowchart illustrating creating a modified halftone image according to the present invention.

Please refer to FIG. 2. FIG. 2 is a flowchart illustrating creating a modified halftone image according to the present invention. Steps contained in the flowchart will be explained below.

Step 100: Start;

Step 105: Create an original halftone image from a continuous original image. That is, an image file is converted into one or more original halftone images, depending on the number of colors to be printed;

Step 110: Adjust the position of dots in the original halftone image with the present invention microstep movement process;

Step 130: A modified halftone image is created containing the dots with adjusted positions; and Step 135: End.

In the present invention method, the original halftone image is altered to create the modified halftone image. The modified halftone image contains a higher resolution than the original halftone image, and this higher resolution allows the dots printed in the modified halftone image to be spaced farther apart. Therefore, the modified halftone image provides superior image quality as compared to that of the original halftone image. For example, halftone images commonly have a resolution of 600×600 dots per inch (dpi). The present invention would convert the original halftone image into a higher resolution, such as 1200×1200 dpi, and increase the space between dots when possible to improve the image quality.

Figure 1:
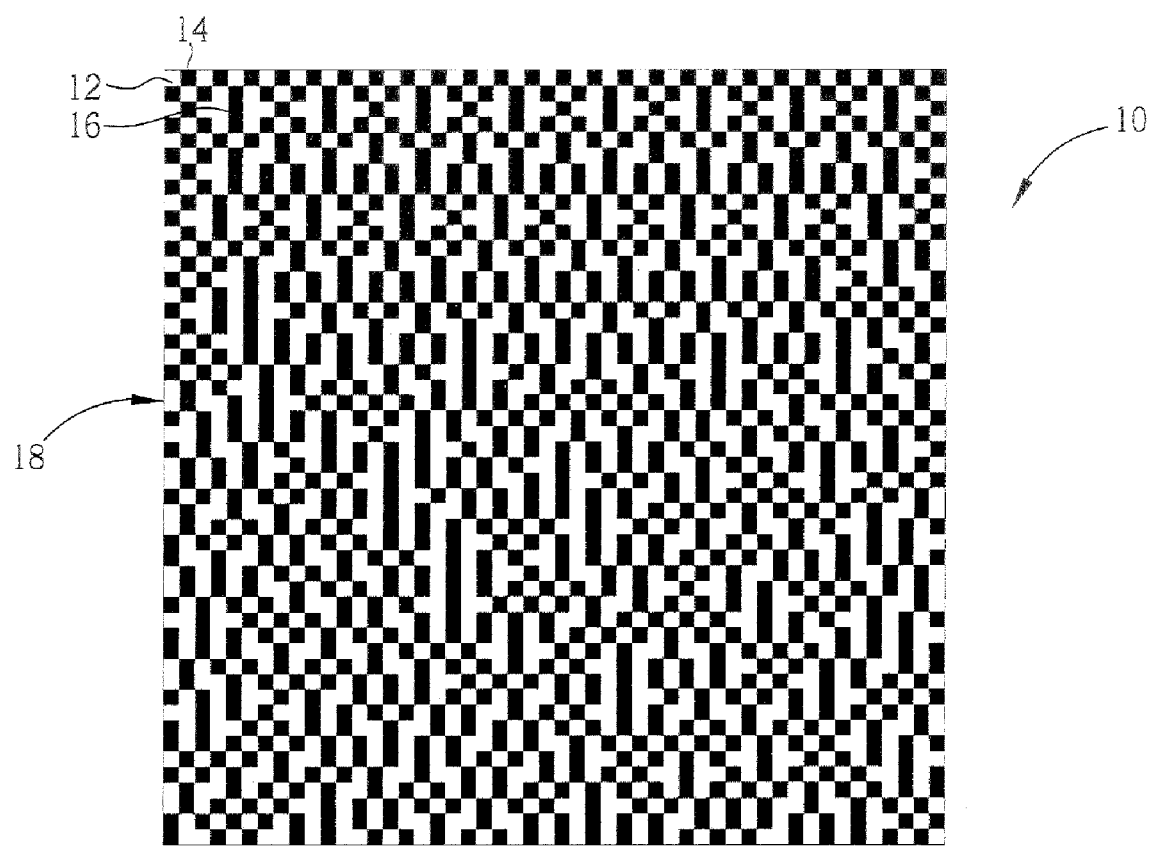
FIG. 1 is an original halftone image 10 according to the prior art.
Figure 3:
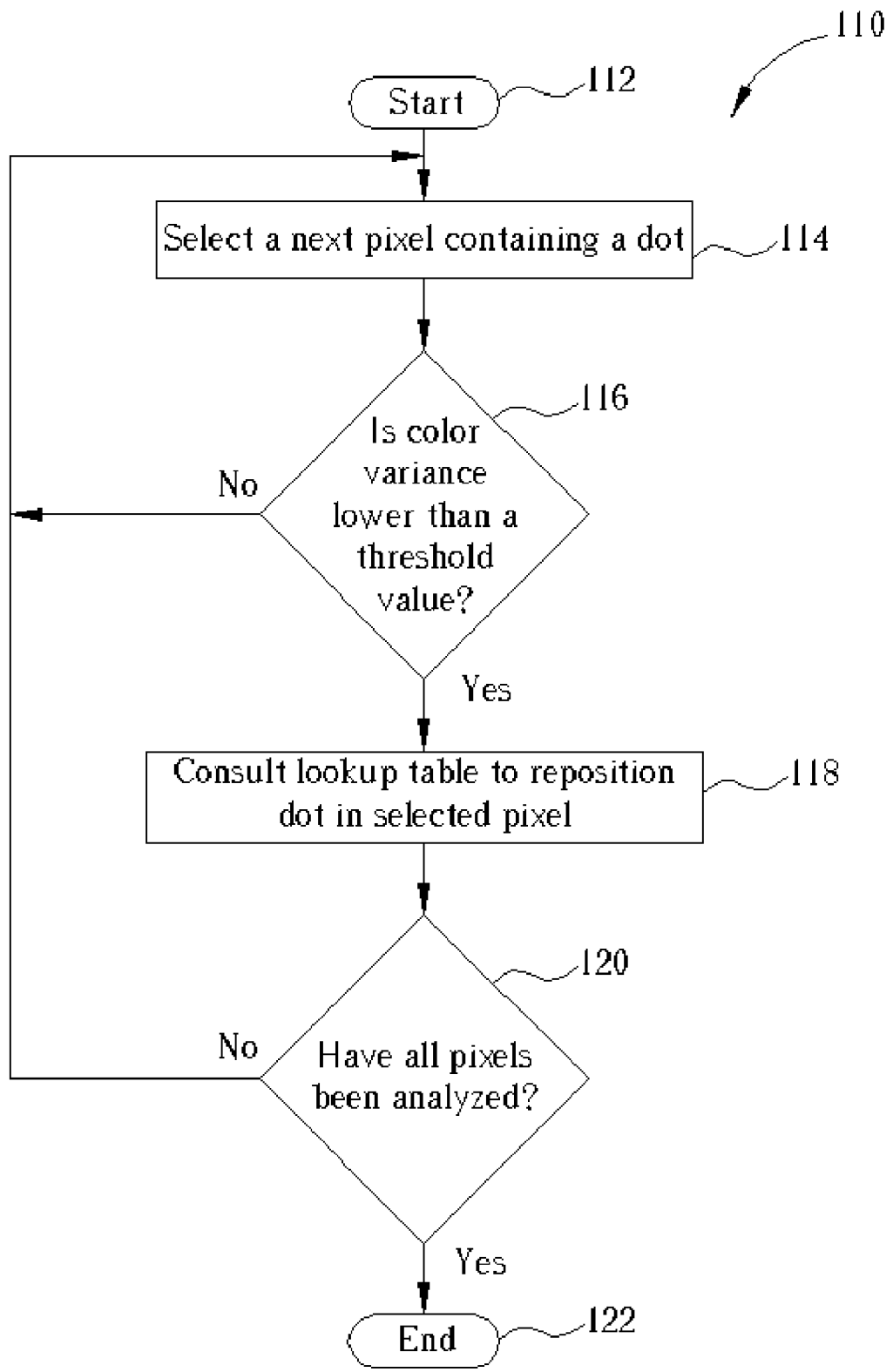
FIG. 3 is a flowchart detailing the present invention microstep movement process for adjusting position of halftone dots.
Figure 4:
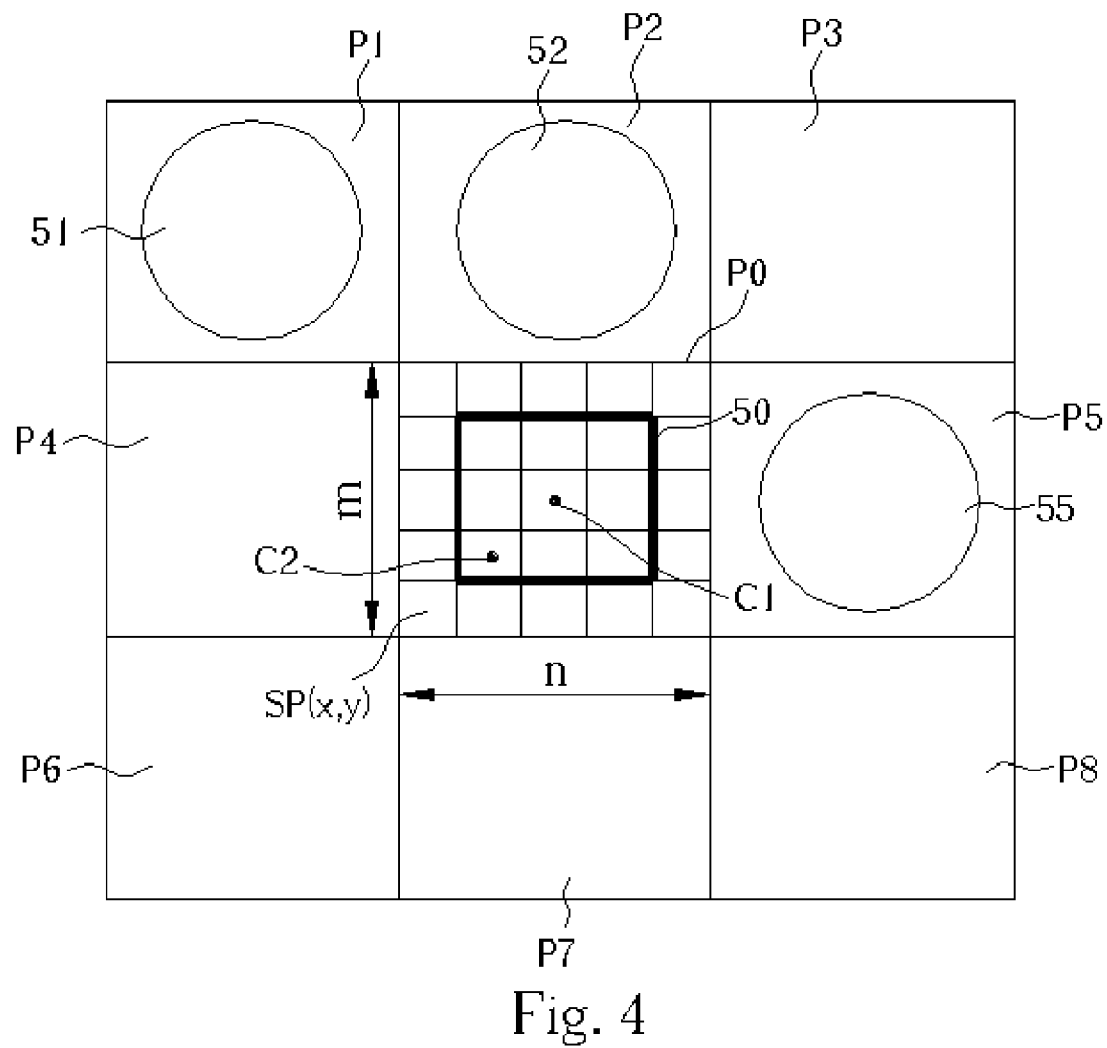
FIG. 4 is a diagram of a selected pixel and eight neighboring pixels.

Please refer to FIG. 3 and FIG. 4 with reference to FIG. 1. FIG. 3 is a flowchart detailing the present invention microstep movement process (step 110 of the flowchart in FIG. 2) for adjusting position of halftone dots. FIG. 4 is a diagram of a selected pixel P0 and eight neighboring pixels P1-P8. In step 114, a next pixel containing a dot to be printed is selected. In FIG. 4, the dot in the selected pixel P0 is not shown, but instead the center of the dot is labeled as point C1. Point C1 is the position of the dot in the selected pixel P0 before position adjusting takes place. The selected pixel P0 can be any pixel in the original halftone image 10 shown in FIG. 1.

In step 116, both the original halftone image 10 and a continuous original image, which was used to generate the original halftone image 10, are analyzed for calculating color variance around the selected pixel P0. If the color variance surrounding a pixel on the continuous original image corresponding to the selected pixel P0 is less than a threshold value, the method continues to step 118 where the position of the dot in the selected pixel P0 is altered. If the color variance is greater than or equal to the threshold value, the position of the dot in the selected pixel P0 is not altered, and the method goes back to step 114 for analyzing a next selected pixel. Measuring the color variance surrounding the selected pixel P0 is an optional step in the present invention method. The color variance is analyzed to prevent pixels on an edge 18 of the original halftone image 10 from being moved outwards away from the other pixels in the halftone image. Moving pixels on the edge 18 farther away from the other pixels will make borders of the image appear shaky, and lower the quality of the printed image. Although there are many formulas that can be used to compute the color variance, one example is given by the formula $$\frac{\max(s) - \min(s)}{\text{SIGNAL\_MAX}} < T$$

, where max(s) and min(s) respectively compute the maximum and minimum color signal values in the pixels neighboring the selected pixel P0 on the continuous original image, SIGNAL_MAX is the maximum color signal value allowable (such as 255 for 8-bit color), and T is a threshold value such as 0.1, 0.2, etc. When the color variance is below the threshold value T, the dot in the selected pixel P0 can be moved to a new position in step 118.

In step 118, the dot in the selected pixel P0 is repositioned according to a lookup table, as will be described in detail later. The dot in the selected pixel P0 is moved to maximize the average distance between the dot in the selected pixel P0 and the dots 51, 52, and 55 in the eight neighboring pixels P1-P8. As shown in FIG. 4, the original position of the dot in the selected pixel P0 was at point C1. After the dot has been moved away from dots 51, 52, and 55 in the neighboring pixels P1-P8, the new position of the dot in the selected pixel P0 will be at point C2.

After the dot in the selected pixel P0 has been repositioned in step 118, the method determines in step 120 if all pixels in the original halftone image 10 have been analyzed for repositioning. If not, the method goes back to step 114 where a next pixel containing a dot is selected. If all pixels have been analyzed, the method is completed in step 122.

Figure 5:
FIG. 5 is a lookup table used for repositioning the dot in the selected pixel according to the present invention.

Please refer to FIG. 5 with reference to FIG. 4. FIG. 5 is a lookup table 70 used for repositioning the dot in the selected pixel P0 according to the present invention. Because the lookup table 70 is stored in memory, and eliminates the need for complex calculations to be performed during the analysis of each pixel, the lookup table 70 is preferably utilized for repositioning the dot in the selected pixel P0. When analyzing the selected pixel P0, the eight neighboring pixels P1-P8 are analyzed to determine which of the neighboring pixels P1-P8 contain dots to be printed. As shown in FIG. 4, pixels P1, P2, and P5 contain dots 51, 52, and 55, respectively. The main objective of the present invention is to move the dot contained in the selected pixel P0 as far away from the dots in neighboring pixels, while still keeping the center of the dot inside the selected pixel P0.

To aid in repositioning the dot in the selected pixel P0, the selected pixel P0 is divided into a plurality of subpixels SP(x,y), where x and y respectively indicate horizontal and vertical positions of the sub-pixel inside the selected pixel P0. The x-scale value n indicates the number of sub-pixels that the selected pixel P0 is divided into in the horizontal direction, whereas the y-scale value m indicates the number of sub-pixels that the selected pixel P0 is divided into in the vertical direction. The values m and n do not necessarily have to be equal, although they are equal in FIG. 4. Therefore, for a given sub-pixel SP(x,y), the values of x and y should satisfy $0 \leq x \leq n-1$ and $0 \leq y \leq m-1$.

When consulting the lookup table 70, the eight neighboring pixels P1-P8 are assigned a binary value according to the presence or absence of a dot. For instance, presence of a dot would correspond to a binary value of "1" and absence of a dot would correspond to "0". These binary values are then combined to form an 8-bit binary code. Since there are eight neighboring pixels P1-P8, there are 256 combinations of dots or blank spaces in the pixels surrounding the selected pixel P0. Each of these 256 combinations is listed in the lookup table 70, and each combination has a corresponding x and y value indicating the new position of the center of the dot in the selected pixel P0. Therefore, the use of the lookup table 70 is quick, and the only calculations needed are analyzing the eight neighboring pixels P1-P8 for the presence of dots and converting the result into an 8-bit binary code. In FIG. 4, the center position of the dot in the selected pixel P0 is indicated by point C1 before adjustment. After adjustment, the dot"s center is moved to point C2, effectively providing more space between the dot in the selected pixel P0 and the dots 51, 52, and 55 in the neighboring pixels P1-P8.

To keep the repositioned dot in the selected pixel P0 from overlapping with other pixels, the center of the repositioned dot may optionally be restricted to a positioning window 50 contained within the selected pixel P0. The positioning window 50 contains the preferred locations for the center of the repositioned dot, and ensures print quality is maintained.

Besides using the lookup table 70, other repositioning algorithms can be used. For instance, the distances between the center of the dot in the selected pixel P0 and each of the dots in the eight neighboring pixels P1-P8 can be calculated. Please note that the distances calculated should be distances in the original halftone image 10, not the distances from dots that have already been repositioned. These distances can then be entered into a system of equations for giving the optimum position of the dot in the selected pixel P0. However, performing these calculations in real-time is very difficult. For this reason, the lookup table 70 is used to store these values ahead of time, thereby enabling the pixel repositioning to be performed in real-time. Different lookup tables can be used for different printing needs. Text documents, photos, and enhanced photos all having different printing characteristics and requirements. Therefore, a different lookup table can be created for each of these printing modes to satisfy the printing requirements.

Figure 6:
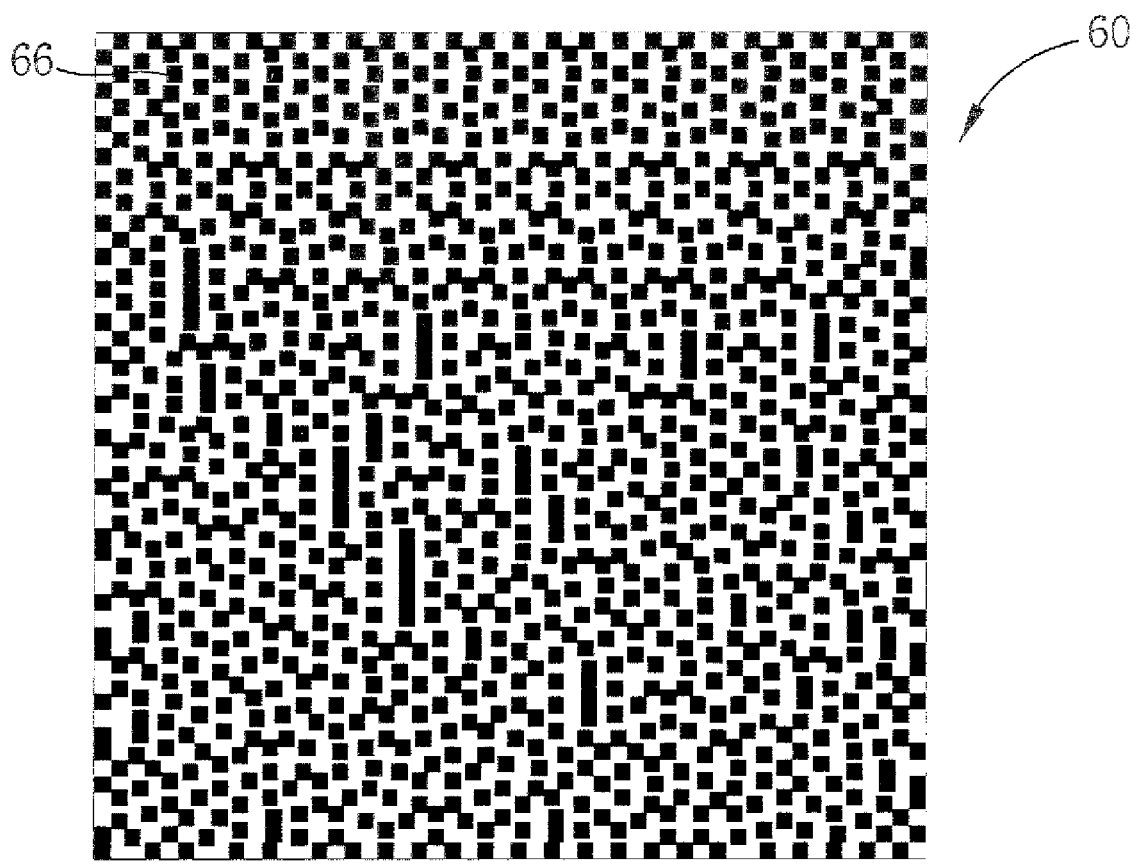
FIG. 6 is a diagram of a modified halftone image produced by the present invention method.

Please refer to FIG. 6 with reference to FIG. 1. FIG. 6 is a diagram of a modified halftone image 60 produced by the present invention method. The modified halftone image 60 contains a higher resolution than the original halftone image 10. Where possible, dots in the modified halftone image 60 have been repositioned for allowing more space between the dots as compared to those of the original halftone image 10. Moreover, the modified halftone image 60 contains less undesirable visual patterns than the original halftone image 10. As an example, the block 16 in the original halftone image 10 is now split apart after utilizing the present invention method, as seen in block 66 of the modified halftone image 60.

In contrast to the prior art, the present invention method improves printing quality by maximizing the distance between dots in neighboring pixels. If a plurality of original halftone images are created, such as four halftone images used in CMYK printing, each of the original halftone images can be repositioned simultaneously in real-time. Thus, the present invention does not significantly delay printing operations, and provides image quality that is superior to that of normal printing. The present invention method controls step motors of printing devices to take microsteps instead of full steps, effectively increasing the resolution of the printed image, and eliminating undesirable visual patterns. The present invention is well suited for use in any printer, copier, or facsimile machine that prints halftone images.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method of adjusting positions of dots in an original halftone image for improving quality of printed images, the original halftone image comprising a plurality of pixels containing either dots to be printed or blank spaces, the method comprising:

selecting a pixel in the original halftone image containing a selected dot to be printed;

analyzing pixels in the original halftone image neighboring the selected pixel to determine if the neighboring pixels contain dots to be printed;

adjusting the position of the selected dot in the selected pixel to increase an average distance between the selected dot and the dots in the neighboring pixels; and creating a modified halftone image in which the position of selected dot has been adjusted.

2. The method of claim 1 wherein analyzing the pixels neighboring the selected pixel comprises analyzing eight neighboring pixels surrounding the selected pixel.

3. The method of claim 1 wherein adjusting the position of the selected dot in the selected pixel comprises adjusting the position of the center of the selected dot in the selected pixel.

4. The method of claim 3 wherein adjusting the position of the selected dot in the selected pixel comprises dividing each pixel into sub-pixels and moving the center of the selected dot to one of the sub-pixels.

5. The method of claim 4 wherein a plurality of subpixels located in an interior section of the selected pixel are chosen to be included in a positioning window, and adjusting the position of the selected dot in the selected pixel comprises moving the center of the selected dot to one of the sub-pixels located in the positioning window.

6. The method of claim 1 further comprising providing a continuous original image corresponding to the original halftone image, locating an original selected pixel in the continuous original image corresponding to the selected pixel of the original halftone image, calculating color variance of pixels neighboring the original selected pixel, and only adjusting the position of the selected dot in the modified halftone image if the color variance is lower than a predetermined value.

7. The method of claim 1 further comprising assigning a number to each of the neighboring pixels and consulting a lookup table to adjust the position of the selected dot in the selected pixel according to the presence of dots in each of the neighboring pixels.

8. The method of claim 1 wherein the position of the selected dot in the selected pixel is adjusted to maximize the average distance between the selected dot and the dots in the neighboring pixels.

9. The method of claim 1 being implemented in a printer.

10. The method of claim 1 being implemented in a facsimile machine.

11. The method of claim 1 being implemented in a copier.

* * * * *